United States Patent
Huang et al.

(10) Patent No.: US 9,997,942 B2
(45) Date of Patent: Jun. 12, 2018

(54) BATTERY CHARGING METHOD AND APPARATUS WITH POWER POINT CHECK AND SWITCHABLE CONTROL

(71) Applicant: INTEL CORPORATION, Santa Clara, CA (US)

(72) Inventors: Lilly Huang, Portland, OR (US); Suvankar Biswas, Minneapolis, MN (US); Vaibhav Vaidya, Portland, OR (US); Krishnan Ravichandran, Saratoga, CA (US)

(73) Assignee: INTEL CORPORATION, Santa Clara, CA (US)

( * ) Notice: Subject to any disclaimer, the term of this patent is extended or adjusted under 35 U.S.C. 154(b) by 69 days.

(21) Appl. No.: 14/580,825

(22) Filed: Dec. 23, 2014

(65) Prior Publication Data

US 2016/0181829 A1 Jun. 23, 2016

(51) Int. Cl.
*H02J 7/00* (2006.01)

(52) U.S. Cl.
CPC ............ *H02J 7/007* (2013.01); *H02J 7/0077* (2013.01)

(58) Field of Classification Search
CPC .............. H02J 7/35; H02J 7/007; H02J 7/0052
USPC .................................. 320/101; 136/291, 293
See application file for complete search history.

(56) References Cited

U.S. PATENT DOCUMENTS

| | | | |
|---|---|---|---|
| 5,923,100 A * | 7/1999 | Lukens | G05F 1/67 136/206 |
| 7,672,937 B2 | 3/2010 | Madhavan et al. | |
| 8,150,841 B2 | 4/2012 | Meyers et al. | |
| 2007/0192792 A1 | 8/2007 | Nagamatsu | |
| 2008/0111517 A1* | 5/2008 | Pfeifer | H02J 7/0065 320/101 |
| 2008/0278119 A1 | 11/2008 | Veselic | |
| 2009/0089169 A1 | 4/2009 | Gupta et al. | |
| 2010/0063755 A1 | 3/2010 | Verdun | |
| 2010/0262454 A1 | 10/2010 | Sommer et al. | |

(Continued)

FOREIGN PATENT DOCUMENTS

| | | |
|---|---|---|
| JP | 2014509829 A | 4/2014 |
| WO | WO2012087589 A1 | 6/2012 |

OTHER PUBLICATIONS

Salas et al., "Review of the maximum power point tracking algorithms for stand-alone photovoltaic systems", 2006, Solar Energy Materials & Solar Cells 90, pp. 1555-1578.*

(Continued)

*Primary Examiner* — Drew A Dunn
*Assistant Examiner* — Michael DiBenedetto
(74) *Attorney, Agent, or Firm* — Schwabe, Williamson & Wyatt, P.C.

(57) ABSTRACT

In embodiments, apparatuses, methods and systems associated with battery charging are disclosed herein. In various embodiments, a reference current selector may receive a battery voltage sense input and output a reference current level signal, a power point check detector may receive a power supply sense input and output a power point check signal, and a controller coupled to the reference current selector and the power point check detector may receive a battery current sense input and switch a control output based at least in part on the reference current level signal, the battery current sense input, and the power point check signal. Other embodiments may be described and/or claimed.

25 Claims, 5 Drawing Sheets

(56) References Cited

U.S. PATENT DOCUMENTS

| | | |
|---|---|---|
| 2010/0299350 A1 | 11/2010 | Konig et al. |
| 2011/0006727 A1* | 1/2011 | Blau .................... H01M 10/44 320/101 |
| 2011/0131243 A1 | 6/2011 | Aben et al. |
| 2012/0130805 A1 | 5/2012 | On et al. |
| 2014/0015454 A1* | 1/2014 | Kunimitsu ........ H01M 10/4257 318/139 |
| 2014/0184137 A1 | 7/2014 | Huang et al. |

OTHER PUBLICATIONS

Chris Navrides, et al., "Temporal Content Selection," U.S. Appl. No. 14/136,334, filed Dec. 20, 2013.

International Search Report and Written Opinion dated Feb. 25, 2016 for International Patent Application No. PCT/US2015/060931, 13 pages.

\* cited by examiner

… (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

BATTERY CHARGING METHOD AND APPARATUS WITH POWER POINT CHECK AND SWITCHABLE CONTROL

TECHNICAL FIELD

The present disclosure relates to the field of electronics, in particular, to apparatuses and methods for charging a battery in a mobile device with varying power sources.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Mobile electronic devices are typically charged using a conventional direct current (DC) power supply connected to an alternating current (AC) power grid using an AC/DC power adaptor. This is not always convenient or possible, such as when a user is in the outdoors hiking, for example. Traditional battery chargers for mobile devices are incapable or ineffective at drawing energy from other sources to charge a battery and power the device.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
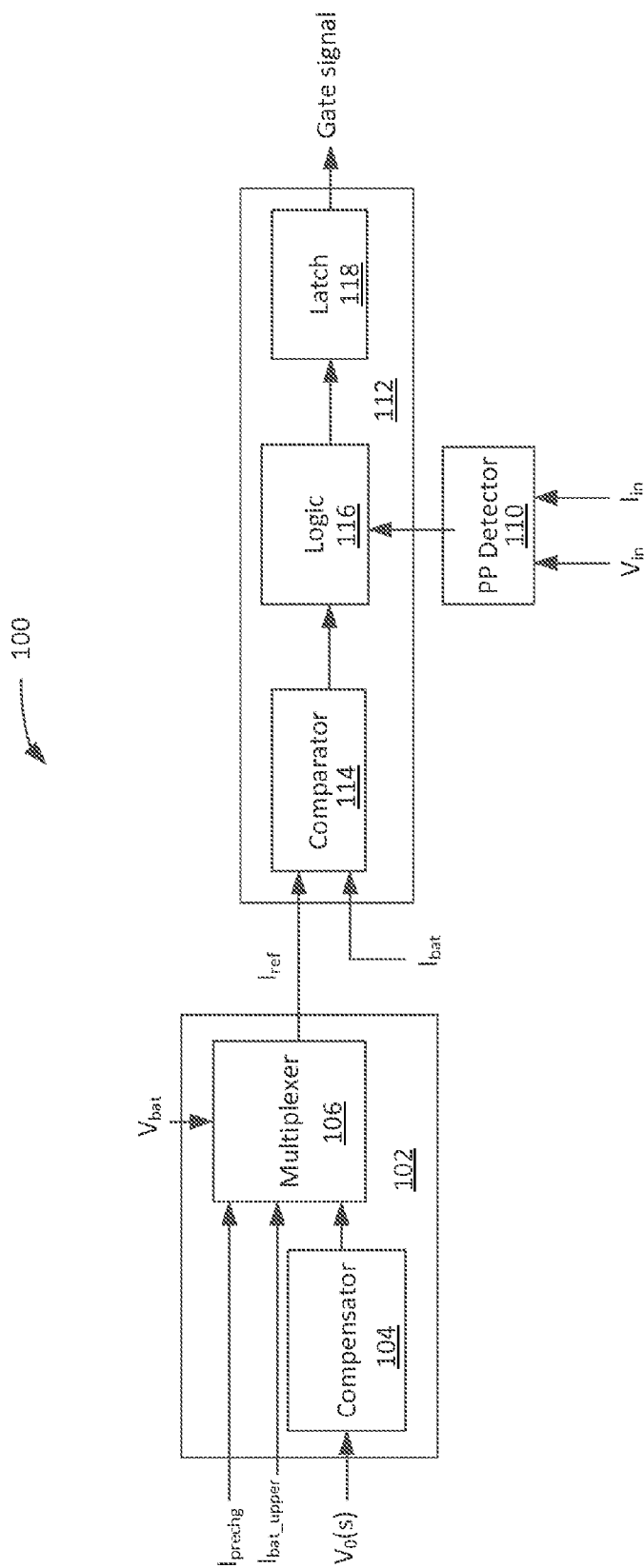
FIG. 1 is a block diagram of a battery charger in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The term "module" may refer to software, firmware and/or circuitry that is/are configured to perform or cause the performance of one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may collectively or individually be embodied as circuitry that forms a part of a computing device. As used herein, the term "processor" may be a processor core.

Referring now to FIG. 1, a block diagram of an electronic battery charge controller 100 in accordance with various embodiments is illustrated. As shown, electronic battery charge controller 100 may include reference current selector 102, power point check detector 110, and controller 112, coupled with each other as shown, and configured to cooperate with each other to selectively control charging of a target battery (not shown). In embodiments, the electronic battery charge controller 100 may include a reference current selector 102 to receive a battery voltage sense input $V_{bat}$ and output a reference current level signal $I_{ref}$ based at least in part on the battery voltage sense input $V_{bat}$. In embodiments, the reference current selector 102 may include a compensator 104 that generates a compensated current $I_{comp}$ based at least in part on a voltage signal $V_0(s)$. The reference current selector 102 may further include a multiplexer 106 in various embodiments that may select $I_{ref}$ from a battery precharge current $I_{prechg}$, an upper battery current $I_{batUpper}$, and the compensated current $I_{comp}$ based at least in part on $V_{bat}$.

The electronic battery charge controller 100 may also include a power point check detector 110 to receive a power supply sense input that may include a power supply voltage sense input $V_{in}$ and a power supply current sense input $I_{in}$. The power point check detector 110 may output a power point check signal based at least in part on the power supply sense input in various embodiments.

In embodiments, the controller 112 may receive a battery current sense input $I_{bat}$ and switch a control output, shown in FIG. 1 as a gate signal, based at least in part on the reference current level signal $I_{ref}$, the battery current sense input $I_{bat}$, and the power point check signal output by the power point check detector 110. The controller 112 may include a comparator 114 that may generate a battery current comparison signal based at least in part on the reference current level signal $I_{ref}$ and the battery current sense input $I_{bat}$. The controller 112 may also include logic 116 that may control a latch 118 based at least in part on the battery current comparison signal and the power point check signal.

In embodiments, the electronic battery charge controller 100 may non-linearly control a power stage such as a buck, boost, or buck boost converter with hysteretic latch based at least in part on simultaneously sensing multiple inputs that may include mode of operation of the target battery (e.g. fully charged vs. low capacity), current charging rate, output voltage to a load, or a power characteristic of an input source (e.g. direct current (DC) power supply or photovoltaic (PV) harvester). The power stage may be coupled to a load and a battery such that power can be delivered to drive the load and charge the battery by drawing from the power source based at least in part on the gate signal generated by the battery charge controller 100.

Figure 2:
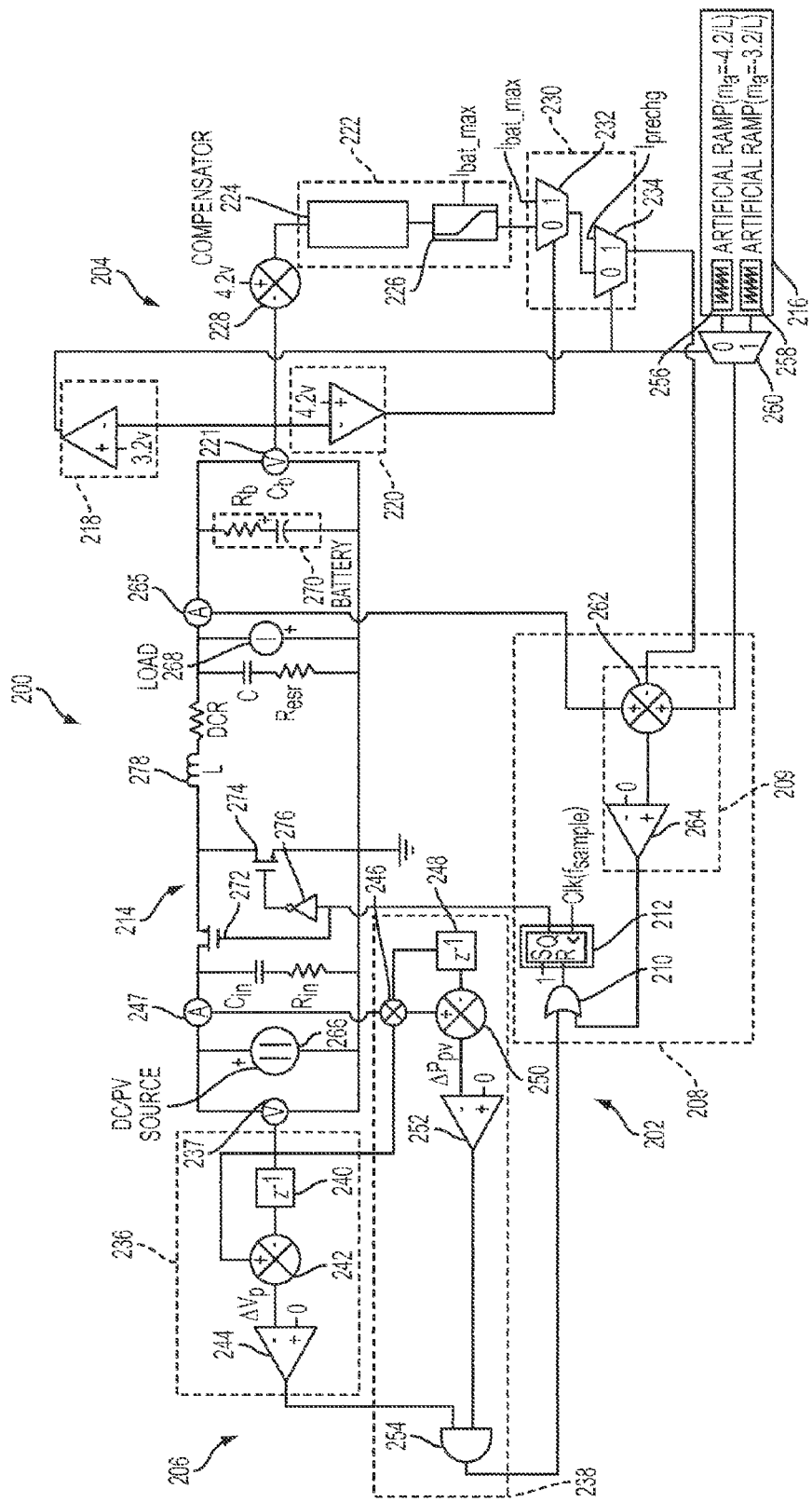
FIG. 2 is a schematic of a battery charger in accordance with various embodiments.

FIG. 2 is a schematic of a system 200 that may include an electronic battery charger 202 in accordance with various embodiments. Electronic battery charger 202 may include a reference current selector 204, a power point check detector 206, and a controller 208 in various embodiments. In embodiments, the reference current selector 204, the power point check detector 206, and the controller 208 may be implementation examples of the reference current selector 102, the power point check detector 110, and the controller 112 respectively as shown and described with respect to FIG. 1. In various embodiments, some or all of the reference current selector 204, the power point check module 206, and the controller 208 may be integrated into a system on a chip (SoC). The components may be implemented in different ways in other embodiments.

The electronic battery charger 202 may provide a unified control scheme for system power delivery that can support either a conventional DC power supply or a harvested energy source with a non-linear power profile such as a PV source, for example. The harvested energy source may be considered to be an auxiliary power source in various embodiments. The electronic battery charger 202 may employ peak-current mode control using a single control loop with some level of hysteretic latch to handle various scenarios and support power conversion, voltage regulation, and dynamic impedance matching when needed. The dynamic impedance matching may be performed by using maximum power point tracking (MPPT) in various embodiments.

The reference current selector 204 may receive a battery voltage sense input $V_{bat}$ 221 and output a reference current level signal $I_{ref}$. The power point check detector 206 may receive a power supply sense input and output a power point check signal based at least in part on the power supply sense input.

In embodiments, the controller 208 may include a battery current comparator 209, an OR gate 210 and a latch 212 that may be implementation examples of the comparator 114, the logic module 116 and the latch 118 shown in FIG. 1. The battery current comparator 209 may generate a current level control signal based at least in part on the reference current level signal $I_{ref}$ and a current of the battery $I_{bat}$ in embodiments. The latch 212 may be an R-dominated S-R latch used as a primary switching control for a power stage of the circuit in various embodiments. In the example shown, the latch 212 may have a high output if S=1 has occurred and R=1 has not occurred. In embodiments, S=1 may occur at a fixed frequency that may define an upper switching frequency of the power stage. An artificial ramp generator 216 may generate one or more artificial ramp signals to provide for additional system stability under peak current mode control in embodiments where artificial ramp signals may provide additional stability such as those using a synchronous buck converter power stage, for example.

In embodiments, the reference current selector 204 may further include a lower threshold detector 218 and an upper threshold detector 220. In embodiments, as shown, the lower threshold detector 218 may be implemented as a first comparator and the upper threshold detector 220 may be implemented as a second comparator. The lower threshold detector 218 and the upper threshold detector 220 may compare the battery voltage sense input $V_{bat}$ 221 to a predetermined lower threshold value and a predetermined upper threshold value respectively. In the example shown, the lower threshold value is 3.2 V and the upper threshold value is 4.2 V. However, other lower and upper threshold values may apply for various battery ratings. The lower threshold detector 218 may receive the battery voltage sense input $V_{bat}$ 221 and output a lower threshold signal based at least in part on the battery voltage sense input $V_{bat}$ 221 and the predetermined lower threshold value. The upper threshold detector 220 may receive the battery voltage sense input $V_{bat}$ 221 and output an upper threshold signal based at least in part on the battery voltage sense input $V_{bat}$ 221 and the predetermined upper threshold value.

In various embodiments, the reference current selector 204 also may include a clamping compensator 222 that may be an implementation example of the compensator 104 shown in FIG. 1. The clamping compensator 222 may include a compensator 224 and a clamp function block 226 in various embodiments. The clamp function block 226 may provide over current protection or limit the upper current value to be less than or equal to $I_{batUpper}$ in various embodiments. $I_{batUpper}$ may represent a maximum rated battery current in various embodiments. The compensator 224 may provide transfer function compensation between inductor and battery currents. In embodiments, the compensator 224 may generate an absorption current level related to a peak current level that can be accepted by the battery under absorption conditions. The reference current selector 204 may also include a first difference block 228 that may subtract the battery voltage sense input 221 from the upper threshold value to produce an output $V_0(s)$ that may be used as an input to the compensator 224 in embodiments. The absorption current may be defined as $G_c(s)V_0(s)$ with $$G_c(s) = \frac{1 + sRC}{1 + s/(f_{crossover} * 2\pi)}$$

where R is an output load and C is an output decoupling capacitor. The clamping compensator 222 may be coupled to the battery voltage sense input 221 and may output a clamped absorption current level based at least in part on the battery voltage sense input 221, the upper threshold value, and a battery upper charge current level $I_{batUpper}$.

The reference current selector 204 may also include a multiplexer block 230 that includes a first multiplexer 232 and a second multiplexer 234 in embodiments. The multiplexer block 230 may function as a reference current selector to output the reference current level signal $I_{ref}$ based at least in part on the lower threshold signal generated by the lower threshold detector 218 and the upper threshold signal generated by the upper threshold detector 220. In embodiments, the reference current selector 204 may output the reference current level signal $I_{ref}$ based at least in part on a battery precharge current level $I_{prechg}$ if the lower threshold signal indicates the battery voltage sense input $V_{bat}$ 221 is below the predetermined lower threshold value, the battery upper charge current level $I_{batUpper}$ if the lower threshold signal indicates the battery voltage sense input $V_{bat}$ 221 is not below the predetermined lower threshold value and the upper threshold signal indicates the battery voltage sense input $V_{bat}$ 221 is below the predetermined upper threshold value, and the clamped absorption current level if the upper threshold signal indicates the battery voltage sense input $V_{bat}$ 221 is not below the predetermined upper threshold value. In various embodiments, when $V_{bat}$ 221 is between the lower and upper threshold values and $I_{ref}$ is based at least in part on $I_{batUpper}$, this may correspond to a fast charging mode.

The power point check detector 206 may include a voltage change detector 236 and a power change detector 238 in various embodiments. The voltage change detector 236 may receive a power source voltage 237 and in embodiments may include a first delay block 240 and a second difference block 242. The power source voltage 237 may be from a harvested power source such as a photovoltaic power source or from a non-harvested power source. The harvested power source may be considered an auxiliary power source in various embodiments. The power source voltage 237 may be delayed at the first delay block 240 to generate a delayed power source voltage signal as an output. The second difference block 242 may receive the delayed power source voltage signal and the non-delayed power source voltage signal as inputs to output a voltage change signal by subtracting the delayed power source voltage signal from the non-delayed power source voltage signal. In embodiments, a voltage change comparator 244 is also included in the voltage change detector 236 that may output a signal corresponding to a logical one if the voltage change output signal is less than zero.

The power change detector 238 may include a multiplier block 246 that receives the power source voltage 237 and a power source current 247 as inputs to generate a power source power output. The power source current 247 may be from a harvested power source such as a photovoltaic power source or may be from a non-harvested power source such as from a direct current power adapter. In embodiments, the power source power output may be used as an input to a second delay block 248 and third difference block 250. The second delay block 248 may delay the power source power signal to generate a delayed power source power signal that is used as a second input to the third difference block 250 in various embodiments. The third difference block 250 may output a power change signal by subtracting the delayed power source power signal from the non-delayed power source power signal. In embodiments, the power change signal may be used as an input by a power change comparator 252 that may output a signal corresponding to a logical one if the power change output signal is less than zero.

An AND gate 254 may take an output of the voltage change comparator 244 and the power change comparator 252 as inputs to produce a power point check signal as an output. A latch component, that may include the OR gate 210 and the latch 212, may receive the current level control signal from the battery current comparator 209 and the power point check signal from the AND gate 254 as inputs to the OR gate 210. The OR gate 210 may output a latch reset signal based at least in opart on the current level control signal and the power point check signal. The latch reset signal may be used as an input to the latch 212 such that the latch 212 may switch a control output based at least in part on the current level control signal and the power point check signal.

In embodiments, the control output may be a Q output of the latch 212. Use of the latch 212 with the control output being based on current and previous inputs to the latch 212 may provide hysteretic control in various embodiments. The power point check detector 206, in combination with the latch 212 may result in single-cycle control of the control output. With this single-cycle control, if the input power of the power source reduces under a current switching cycle, the control output of the latch 212 may be activated such that the input power may increase in the next switching cycle in various embodiments.

In embodiments, the artificial ramp generator 216 may generate a first artificial ramp 256 and a second artificial ramp 258. The first artificial ramp 256 may have a signal represented by $I_{ar}=-(upper\ threshold\ value/L)*(t<MOD>Ts)$ and the second artificial ramp 258 may have a signal represented by $I_{ar}=-(lower\ threshold\ value/L)*(t<MOD>Ts)$ in various embodiments. A third multiplexer 260 may be used to select between the first artificial ramp 256 and the second artificial ramp 258 in various embodiments. The third multiplexer may select the first artificial ramp 256 if the lower threshold detector 218 outputs a logical zero and may select the second artificial ramp 258 if the lower threshold detector 218 outputs a logical one. The battery current comparator 209 of the controller 208 may include a summation block 262 and a current comparator 264 in embodiments. The summation block 262 may take as inputs a battery current $I_{bat}$ 265, the reference current output by the multiplexer block 230, and the artificial ramp output by the third multiplexer 260 in embodiments.

The power stage 214 may be a synchronous buck power converter in various embodiments. However, other designs may also be used such as a boost or buck boost converter design. A power source 266 and a load 268 as well as a battery 270 may be in signal communication with the power stage 214 in various embodiments. A battery terminal 271 may be coupled to the load 268 such that when the battery 270 is connected to the battery terminal 271, the battery 270 may be in signal communication with the power stage 214 and the load 268. The power source 266 may be either a DC power supply or a harvested energy source such as from a photovoltaic source in various embodiments. The load 268 may be a varying current load or a voltage regulator type varying power load in embodiments. The load 268 may include components of a computing device such as a processor, a memory device, or a display. In various embodiments, the system 200 may be a mobile computing device such as a tablet computer or a smartphone.

The power stage 214 may include a first field effect transistor (FET) 272 and a second FET 274 as shown in embodiments. Other types of switching devices may be used in various other embodiments. An inverter 276 may take an output of the latch 212 as an input such that the second FET 274 is switched with an inverted gate signal and the first FET 272 is switched with a non-inverted gate signal as output by the latch 212. Alternatively, in other embodiments, the latch 212 may include both non-inverted and inverted Q outputs such that the inverted Q output is used rather than using the inverter 276 to invert the non-inverted Q output. In operation, the first FET 272 and the second FET 274 may be selectively switched to allow current from the power source 266 to pass either to ground or through an inductor 278. Various resistances and capacitances are also shown with respect to the power stage 214, including a direct current resistance (DCR) relating to the inductor 278, input resistance and capacitance, resistance and capacitance of the battery 270, and an equivalent series resistance (ESR) relating to a capacitor shown connected in parallel with the load 268.

Figure 3:
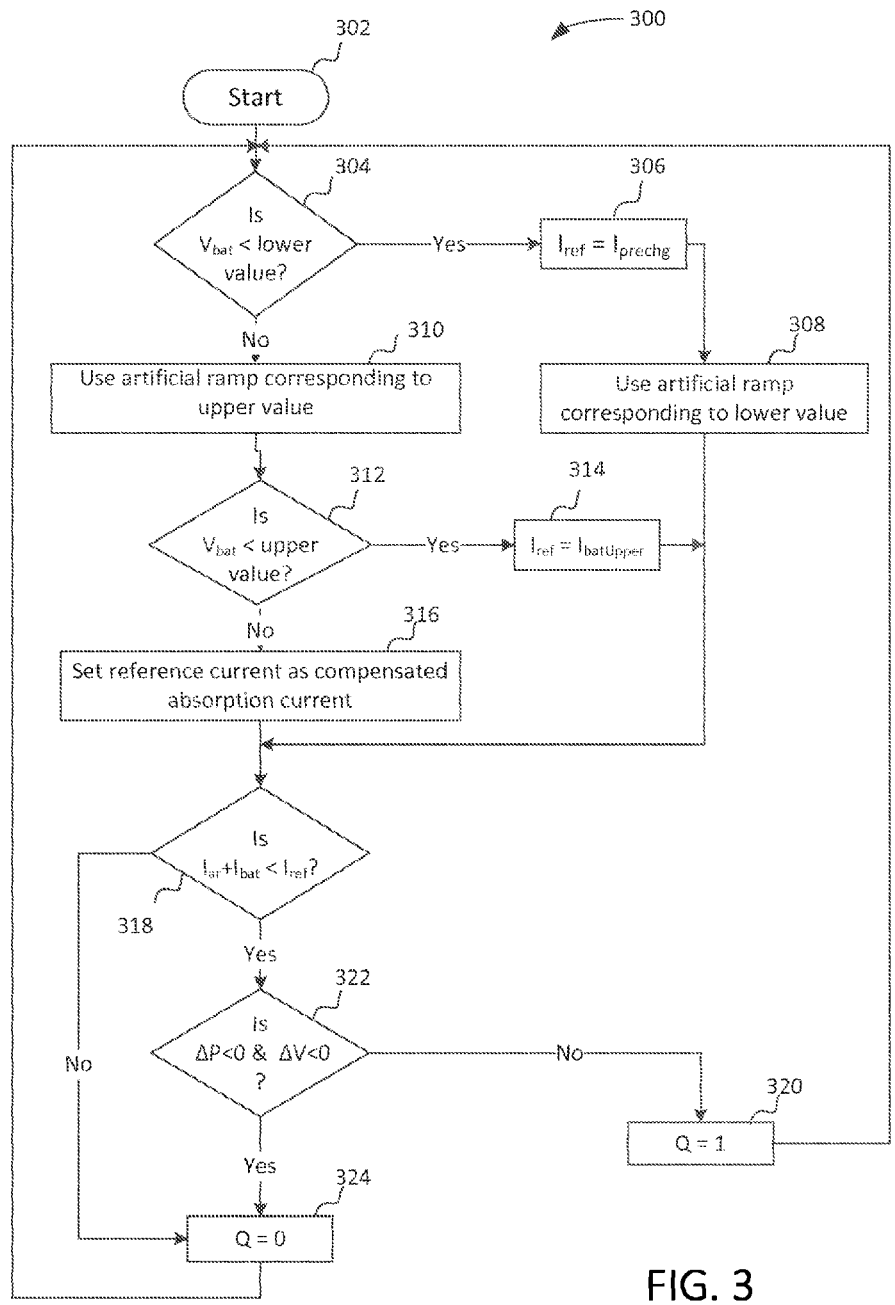
FIG. 3 is a flow diagram of an example process of charging a battery, in accordance with various embodiments.

FIG. 3 is a flow diagram of an example process 300 of charging a battery that may be implemented at least in part by the electronic battery charge controller 100 described with respect to FIG. 1 or the electronic battery charger 202 described with respect to FIG. 2, in accordance with various embodiments. The process 300 may start at a block 302 and proceed to a decision block 304 where it may be determined whether a battery voltage is less than a predetermined lower threshold voltage. In an example embodiment, the lower threshold voltage may be 3.2 V. However, other lower threshold voltages may be used according to the characteristics of the battery. The operations of the decision block 304 may be performed by the lower threshold detector 218 in various embodiments, for example. If, at the decision block 304, it is determined that the battery voltage $V_{bat}$ is below the predetermined lower threshold voltage, the process 300 may proceed to a block 306 where a reference current $I_{ref}$ may be assigned to be a battery precharge current $I_{prechg}$. The operation of the block 306 may be performed by the second multiplexer 234, for example. Additionally, if at the block 304, the battery voltage $V_{bat}$ is determined to be below the lower threshold voltage, a ramp compensation signal may be assigned to correspond to the lower threshold voltage value such as may occur by the third multiplexer 260 selecting the second artificial ramp 258 from the artificial ramp generator 216, for example.

If, at the decision block 304, it is determined that the battery voltage $V_{bat}$ is not below the predetermined lower threshold voltage, the process 300 may proceed to a block 310 where a ramp compensation signal may be selected to correspond to an upper threshold voltage value such as may be implemented by the third multiplexer 260 selecting the first artificial ramp 256 generated by the artificial ramp generator 216, for example. The process 300 may then proceed to a decision block 312 were it may be determined whether the battery voltage $V_{bat}$ is below an upper threshold voltage value. In an example embodiment, the upper threshold voltage value may be 4.2 V. However, other upper threshold voltages may be used according to the characteristics of the battery. The operation performed by the decision block 312 may be performed by the upper threshold detector 220, for example. In embodiments, the operations performed at the decision block 304 and the decision block 312 may determine a charge state of the battery.

If, at the decision block 312, it is determined that the battery voltage $V_{bat}$ is below the upper threshold voltage, the process may proceed to a block 314 where the reference current $I_{ref}$ is assigned to be an upper battery current $I_{batUpper}$. The operation performed at the block 314 may, in embodiments, be performed by the first multiplexer 232 and the second multiplexer 234 of the multiplexer block 230 in various embodiments. If, at the decision block 312, it is determined that the battery voltage $V_{bat}$ is not below the upper threshold value, the reference current $I_{ref}$ may be assigned to be a compensated current signal at a block 316 that may be an absorption current level in embodiments. The operation performed at the block 316 may be implemented by the compensator 224, the clamp function block 226, the first multiplexer 232, and the second multiplexer 234 described with respect to FIG. 2, in embodiments.

The process 300 may then proceed to a decision block 318 where it may be determined whether a battery current plus an artificial ramp current are less than the assigned reference current. This may be implemented using the summation block 262 and the current comparator 264 of the battery current comparator 209 discussed with respect to FIG. 2 in various embodiments. A current level control signal based at least in part on the reference current $I_{ref}$ and the battery current $I_{bat}$ may be generated at the decision block 318. If, at the decision block 318, it is determined that the summed battery reference current and artificial ramp current ($I_{bat}+I_{ar}$) are not less than the selected reference voltage $I_{ref}$, the process may proceed to a block 324 where a Q output of a control circuit such as the Q output of the latch 212 may be assigned to zero such as may occur by presenting a voltage representing a logical one at an 'R' input of the latch 212, for example.

If, at the decision block 318, it is determined that the summed battery current and artificial ramp current are less than the selected reference current, the process 300 may proceed to a decision block 322 where a power point check may be performed by determining whether both a change in power level of the power source is less than zero and a change in voltage level of the power source is less than zero. The power source may be a harvested energy source such as a photovoltaic source or a non-harvested source such as a DC power supply. The operations performed at the decision block 322 may be implemented by the power change detector 238 and the voltage change detector 236 discussed with respect to FIG. 2 in various embodiments, for example. In embodiments, the change in power level of the power source may be based at least in part on a first power level of the power source and a subsequent second power level of the power source. Similarly, the change in voltage level of the power source may be based at least in part on a first voltage level of the power source and a subsequent second voltage level of the power source.

If, at the decision block 322, it is determined that that either the change in power is nonnegative or the change in voltage is nonnegative, the process 300 may then proceed to the block 320 where the Q output is set to a logical one such as may occur after setting the a' input of the latch 212 to zero, for example. If, at the decision block 322, it is determined that the change in power is less than zero and the change in voltage is less than zero, the process 300 may then proceed to the block 324 where the Q output is set to a logical zero as discussed above. Following assignment of the Q output to either zero or one at the block 324 or the block 320, respectively, the process 300 cycles back and returns to the decision block 304 in various embodiments.

Figure 4:
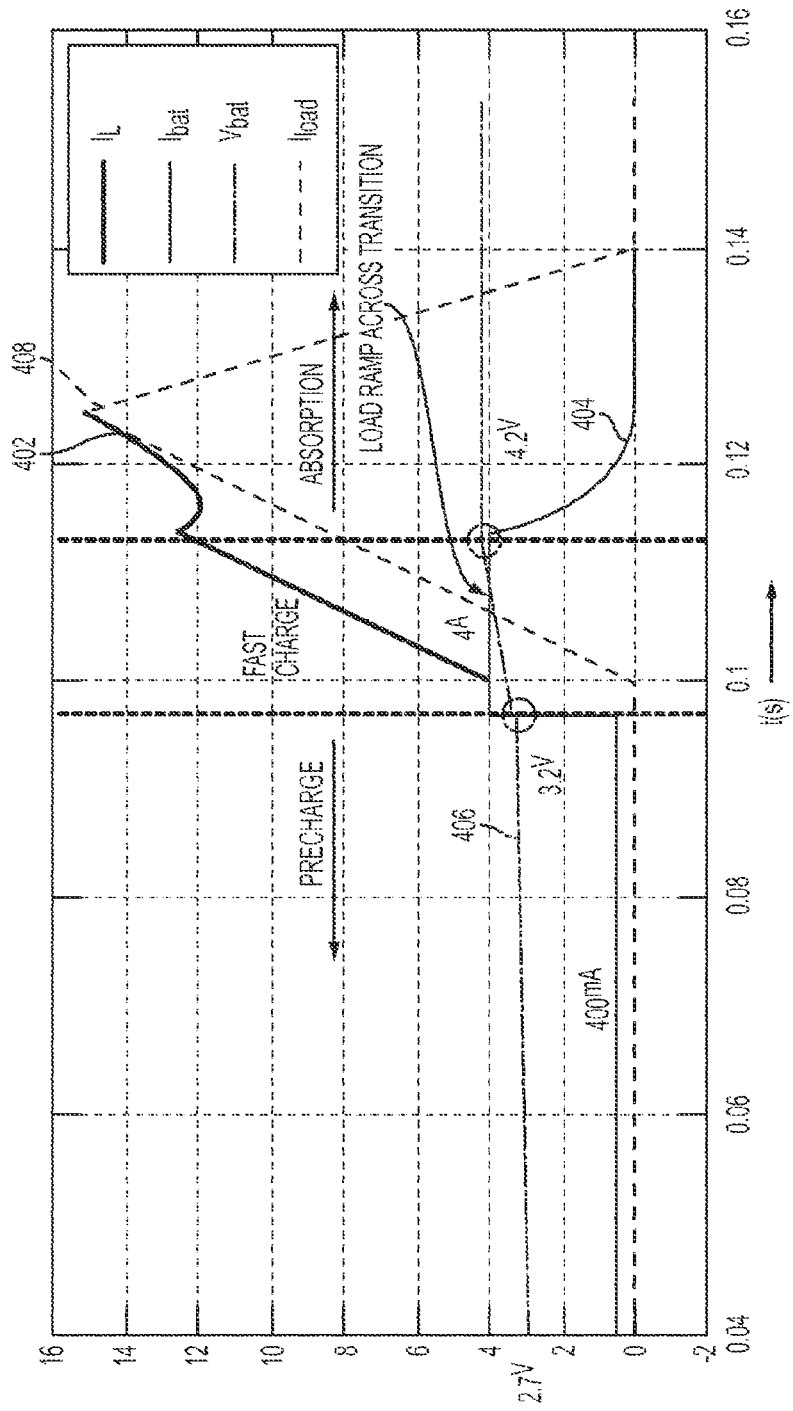
FIG. 4 is a plot of an example set of curves according to an embodiment using a direct current power supply as an input power source.
Figure 5:
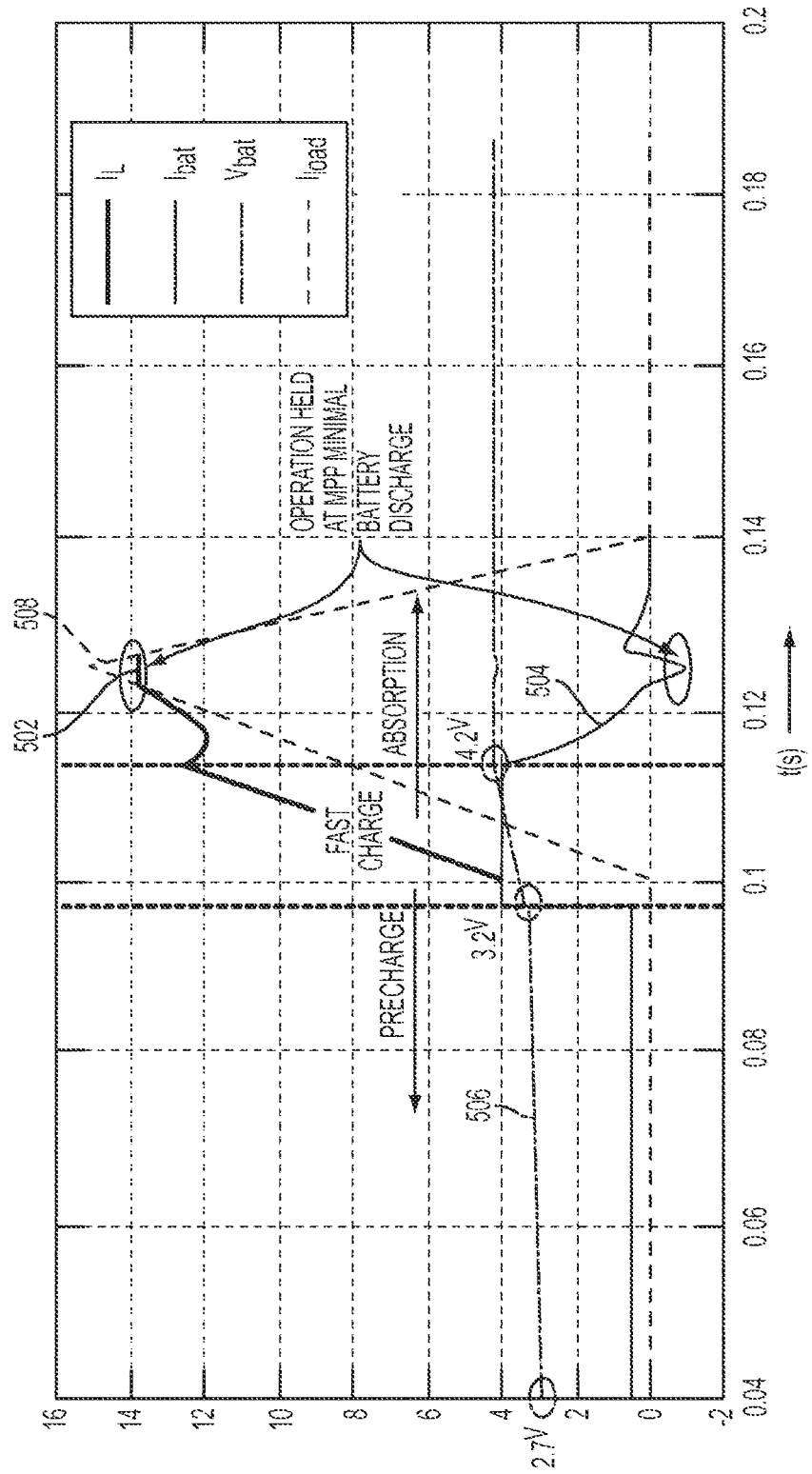
FIG. 5 is a plot of an example set of curves according to an embodiment using a photovoltaic harvested energy input as a power source.

Referring now to FIGS. 4 and 5, simulation results from an example embodiment using a DC power supply input and a PV harvested energy input, respectively, as the power source are shown. FIG. 4 is a plot of an example set of curves according to an embodiment using a direct current power supply as an input power source. The plot illustrates an inductor current $I_L$ 402, a battery current $I_{bat}$ 404, a battery voltage $V_{bat}$ 406, and a load current $I_{load}$ 408 under precharge ($V_{bat}$<lower threshold), fast charge (lower threshold <$V_{bat}$<upper threshold), and absorption conditions ($V_{bat}$>upper threshold).

FIG. 5 is a plot of an example set of curves according to an embodiment using a photovoltaic harvested energy input as a power source. The plot illustrates an inductor current $I_L$ 502, a battery current $I_{bat}$ 504, a battery voltage $V_{bat}$ 506, and a load current $I_{load}$ 508 under precharge ($V_{bat}$<lower threshold), fast charge (lower threshold <$V_{bat}$<upper threshold), and absorption conditions ($V_{bat}$>upper threshold). In comparison to the set of curves shown in FIG. 4, it can be seen that the inductor current $I_L$ may not completely track the load current $I_{load}$ at peak load conditions when using a PV source, such that the battery current $I_{bat}$ dips below zero, indicating a battery discharge state. In embodiments, this battery discharge may be minimized by maximum power point tracking such as may be provided by the power point check detector 206 discussed with respect to FIG. 2, for example.

Examples

Example 1 may include an electronic battery charge controller comprising: a reference current selection module to receive a battery voltage sense input, the reference current selection module to output a reference current level signal based at least in part on the battery voltage sense input; a power point check module to receive a power supply sense input, the power point check module to output a power point check signal based at least in part on the power supply sense input; and control logic coupled to the reference current selection module and the power point check module, the control logic to receive a battery current sense input and switch a control output based at least in part on the reference current level signal, the battery current sense input, and the power point check signal.

Example 2 may include the subject matter of Example 1, wherein the power point check module is to receive a power supply sense input comprising: a power supply voltage sense input; and a power supply current sense input, and wherein the power point check module comprises: a power change module to receive the power supply voltage sense input and the power supply current sense input, the power change module to output a power change signal based at least in part on the power supply voltage sense input and the power supply current sense input; and a voltage change module to receive the power supply voltage sense input, the voltage change module to output a voltage change signal based at least in part on the power supply voltage sense input, the power point check module to output the power point check signal based at least in part on the power change signal and the voltage change signal.

Example 3 may include the subject matter of any one of Examples 1-2, wherein the reference current selection module comprises: a lower threshold detector to receive the battery voltage sense input, the lower threshold detector to output a lower threshold signal based at least in part on the battery voltage sense input and a predetermined lower threshold value; an upper threshold detector to receive the battery voltage sense input, the upper threshold detector to output an upper threshold signal based at least in part on the battery voltage sense input and a predetermined upper threshold value; and a reference current selector coupled to the lower threshold detector and the upper threshold detector, the reference current selector to output the reference current level signal based at least in part on the lower threshold signal and the upper threshold signal.

Example 4 may include the subject matter of Example 3, wherein the reference current selector is to output the reference current signal based at least in part on: a battery precharge current level if the lower threshold signal indicates the battery voltage sense input is below the predetermined lower threshold value; a battery upper charge current level if the lower threshold signal indicates the battery voltage sense input is not below the predetermined lower threshold value and the upper threshold signal indicates the battery voltage sense input is below the predetermined upper threshold value; and an absorption current level if the upper threshold signal indicates the battery voltage sense input is not below the predetermined upper threshold value.

Example 5 may include the subject matter of Example 4, wherein the reference current selection module further comprises a compensation module coupled to the battery voltage sense input, the compensation module to output the absorption current level based at least in part on the battery voltage sense input, the upper threshold value, and the battery upper charge current level.

Example 6 may include the subject matter of any one of Examples 1-5, wherein the control logic comprises: a comparison module to receive the battery current sense input and the reference current level signal, the comparison module to output a current level control signal based at least in part on the reference current level and the battery current sense input; and a latch module to receive the current level control signal and the power point check signal, the latch module comprising a latch to switch the control output based at least in part on the current level control signal and the power point check signal.

Example 7 may include the subject matter of any one of Examples 1-6, wherein the power point check module is to receive a harvested power supply sense input.

Example 8 may include the subject matter of any one of Examples 1-7, wherein the reference current selection module, the power point check module, and the control logic are all integrated into a system on a chip, SoC.

Example 9 may include the subject matter of Example 8, wherein the power point check module is to receive a harvested power supply sense input comprising: a harvested power supply voltage sense input; and a harvested power supply current sense input, wherein the power point check module comprises: a power change module to receive the harvested power supply voltage sense input and the harvested power supply current sense input, the power change module to output a power change signal based at least in part on the harvested power supply voltage sense input and the harvested power supply current sense input; and a voltage change module to receive the harvested power supply voltage sense input, the voltage change module to output a voltage change signal based at least in part on the harvested power supply voltage sense input, wherein the power point check module is to output the power point check signal based at least in part on the power change signal and the voltage change signal, wherein the reference current selection module comprises: a lower threshold detector to receive the battery voltage sense input, the lower threshold detector to output a lower threshold signal based at least in part on the battery voltage sense input and a predetermined lower threshold value; an upper threshold detector to receive the battery voltage sense input, the upper threshold detector to output an upper threshold signal based at least in part on the battery voltage sense input and a predetermined upper threshold value; a reference current selector coupled to the lower threshold detector and the upper threshold detector, the reference current selector to output the reference current level signal based at least in part on the lower threshold signal and the upper threshold signal; and a compensation module coupled to the battery voltage sense input, the compensation module to output an absorption current level based at least in part on the battery voltage sense input, the upper threshold value, and a battery upper charge current level, wherein the reference current selector is to output the reference current signal based at least in part on: a battery precharge current level if the lower threshold signal indicates the battery voltage sense input is below the predetermined lower threshold value; the battery upper charge current level if the lower threshold signal indicates the battery voltage sense input is not below the predetermined lower threshold value and the upper threshold signal indicates the battery voltage sense input is below the predetermined upper threshold value; and the absorption current level if the upper threshold signal indicates the battery voltage sense input is not below the predetermined upper threshold value, wherein the control logic comprises: a comparison module to receive the battery current sense input and the reference current level signal, the comparison module to output a current level control signal based at least in part on the reference current level and the battery current sense input; and a latch module to receive the current level control signal and the power point check signal, the latch module comprising a latch to switch the control output based at least in part on the current level control signal and the power point check signal.

Example 10 may include a method of charging a battery coupled to a power source and a load, the method comprising: performing, by an electronic battery charger, a power point check of the power source; determining, by the electronic battery charger, a charge state of the battery; switching, by the electronic battery charger, a power stage control signal based at least in part on the power point check and the charge state; and causing, by the electronic battery charger, delivery of power to the battery in a single power conversion stage based at least in part on the power stage control signal.

Example 11 may include the subject matter of Example 10, wherein performing the power point check of the power source comprises: determining a power level change based at least in part on a first power level of the power source and a subsequent second power level of the power source; and determining a voltage level change based at least in part on a first voltage level of the power source and a subsequent second voltage level of the power source, wherein switching the power stage control signal comprises indicating an off state if the power level change is negative and the voltage level change is negative.

Example 12 may include the subject matter of any one of Examples 10-11, further comprising selecting, by the electronic battery charger, a reference current based at least in part on the charge state of the battery, wherein determining the charge state of the battery comprises: comparing a voltage of the battery to a lower threshold value; and comparing the voltage of the battery to an upper threshold value, wherein selecting the reference current comprises: selecting a battery precharge current as the reference current if the battery voltage is below the lower threshold value; selecting a battery upper charge current as the reference current if the battery voltage is not below the lower threshold value; and selecting an absorption current as the reference current if the battery voltage is not below the upper threshold value, wherein switching the power stage control signal is also based at least in part on the reference current.

Example 13 may include the subject matter of Example 12, further comprising: generating, by the electronic battery charger, a current level control signal based at least in part on the reference current and a current of the battery, wherein switching the power stage control signal is also based at least in part on the current level control signal.

Example 14 may include the subject matter of any one of Examples 10-13, further comprising selecting, by the electronic battery charger, a reference current based at least in part on the charge state of the battery, wherein determining the charge state of the battery comprises: comparing a voltage of the battery to a lower threshold value; and comparing the voltage of the battery to an upper threshold value, wherein selecting the reference current comprises: selecting a battery precharge current as the reference current if the battery voltage is below the lower threshold value; selecting a battery upper charge current as the reference current if the battery voltage is not below the lower threshold value; and selecting an absorption current as the reference current if the battery voltage is not below the upper threshold value, wherein the performing the power point check of the power source comprises: determining a power level change based at least in part on a first power level of the power source and a subsequent second power level of the power source; and determining a voltage level change based at least in part on a first voltage level of the power source and a subsequent second voltage level of the power source, wherein switching the power stage control signal comprises indicating an off state if the power level change is negative and the voltage level change is negative and wherein switching the power stage control signal is also based at least in part on the reference current.

Example 15 may include the subject matter of Example 14, wherein delivering power to the battery comprises delivering power to the battery with a buck power stage based at least in part on the power stage control signal.

Example 16 may include the subject matter of Example 15, wherein performing the power point check of the power source comprises: determining a power level change based at least in part on a first power level of a harvested power source and a subsequent second power level of the harvested power source; and determining a voltage level change based at least in part on a first voltage level of the harvested power source and a subsequent second voltage level of the harvested power source.

Example 17 may include a system comprising: a load including one or more of a processor, a memory device, or a display; a battery terminal coupled to the load; a power stage coupled to the battery terminal; and a control module coupled to the power stage, the control module comprising: a power point check module to receive a power supply sense input, the power point check module to output a power point check signal based at least in part on the power supply sense input; a reference current selection module coupled to the battery terminal to receive a battery voltage sense input, the reference current selection module to output a reference current level signal based at least in part on the battery voltage sense input; and control logic coupled to the power point check module, the reference current selection module, and the power stage, the control logic to receive a battery current sense input and switch a control output coupled to the power stage based at least in part on the reference current level signal, the battery current sense input, and the power point check signal.

Example 18 may include the subject matter of Example 17, wherein the power point check module is to receive a power supply sense input comprising: a power supply voltage sense input; and a power supply current sense input, and wherein the power point check module comprises: a power change module to receive the power supply voltage sense input and the power supply current sense input, the power change module to output a power change signal based at least in part on the power supply voltage sense input and the power supply current sense input; and a voltage change module to receive the power supply voltage sense input, the voltage change module to output a voltage change signal based at least in part on the power supply voltage sense input, the power point check module to output the power point check signal based at least in part on the power change signal and the voltage change signal.

Example 19 may include the subject matter of any one of Examples 17-18, wherein the reference current selection module comprises: a lower threshold detector to receive the battery voltage sense input, the lower threshold detector to output a lower threshold signal based at least in part on the battery voltage sense input and a predetermined lower threshold value; an upper threshold detector to receive the battery voltage sense input, the upper threshold detector to output an upper threshold signal based at least in part on the battery voltage sense input and a predetermined upper threshold value; and a reference current selector coupled to the lower threshold detector and the upper threshold detector, the reference current selector to output the reference current level signal based at least in part on the lower threshold signal and the upper threshold signal.

Example 20 may include the subject matter of Example 19, wherein the reference current selector is to output the reference current signal based at least in part on: a battery precharge current level if the lower threshold signal indicates the battery voltage sense input is below the predetermined lower threshold value; a battery charge current level if the lower threshold signal indicates the battery voltage sense input is not below the predetermined lower threshold value and the upper threshold signal indicates the battery voltage sense input is below the predetermined upper threshold value; and an absorption current level if the upper threshold signal indicates the battery voltage sense input is not below the predetermined upper threshold value.

Example 21 may include the subject matter of Example 20, wherein the reference current selection module further comprises a compensation module coupled to the battery voltage sense input, the compensation module to output the absorption current level based at least in part on the battery voltage sense input, the upper threshold value, and the battery charge current level.

Example 22 may include the subject matter of any one of Examples 17-21, wherein the control logic comprises: a comparison module to receive the battery current sense input and the reference current level signal, the comparison module to output a current level control signal based at least in part on the reference current level and the battery current sense input; and a latch module to receive the current level control signal and the power point check signal, the latch module comprising a latch to switch the control output based at least in part on the current level control signal and the power point check signal.

Example 23 may include the subject matter of any one of Examples 17-22, wherein the power point check module is to receive a harvested power supply sense input.

Example 24 may include the subject matter of any one of Examples 17-23, wherein the reference current selection module, the power point check module, and the control logic are all integrated into a system on a chip, SoC.

Example 25 may include the subject matter of Example 24, wherein the power point check module is to receive a harvested power supply sense input comprising: a harvested power supply voltage sense input; and a harvested power supply current sense input, wherein the power point check module comprises: a power change module to receive the harvested power supply voltage sense input and the harvested power supply current sense input, the power change module to output a power change signal based at least in part on the harvested power supply voltage sense input and the harvested power supply current sense input; and a voltage change module to receive the harvested power supply voltage sense input, the voltage change module to output a voltage change signal based at least in part on the harvested power supply voltage sense input, wherein the power point check module is to output the power point check signal based at least in part on the power change signal and the voltage change signal, wherein the reference current selection module comprises: a lower threshold detector to receive the battery voltage sense input, the lower threshold detector to output a lower threshold signal based at least in part on the battery voltage sense input and a predetermined lower threshold value; an upper threshold detector to receive the battery voltage sense input, the upper threshold detector to output an upper threshold signal based at least in part on the battery voltage sense input and a predetermined upper threshold value; a reference current selector coupled to the lower threshold detector and the upper threshold detector, the reference current selector to output the reference current level signal based at least in part on the lower threshold signal and the upper threshold signal; and a compensation module coupled to the battery voltage sense input, the compensation module to output an absorption current level based at least in part on the battery voltage sense input, the upper threshold value, and a battery charge current level, wherein the reference current selector is to output the reference current signal based at least in part on: a battery precharge current level if the lower threshold signal indicates the battery voltage sense input is below the predetermined lower threshold value; the battery charge current level if the lower threshold signal indicates the battery voltage sense input is not below the predetermined lower threshold value and the upper threshold signal indicates the battery voltage sense input is below the predetermined upper threshold value; and the absorption current level if the upper threshold signal indicates the battery voltage sense input is not below the predetermined upper threshold value, wherein the control logic comprises: a comparison module to receive the battery current sense input and the reference current level signal, the comparison module to output a current level control signal based at least in part on the reference current level and the battery current sense input; and a latch module to receive the current level control signal and the power point check signal, the latch module comprising a latch to switch the control output based at least in part on the current level control signal and the power point check signal.

Example 26 may include an electronic battery charger comprising: means for performing a power point check of the power source; means for determining a charge state of the battery; means for switching a power stage control signal based at least in part on the power point check and the charge state; and means delivering power to the battery in a single power conversion stage based at least in part on the power stage control signal.

Example 27 may include the subject matter of Example 26, wherein the means performing the power point check of the power source comprises: means for determining a power level change based at least in part on a first power level of the power source and a subsequent second power level of the power source; and means for determining a voltage level change based at least in part on a first voltage level of the power source and a subsequent second voltage level of the power source, wherein the means for switching the power stage control signal comprises means for indicating an off state in response to the power level change is negative and the voltage level change is negative.

Example 28 may include the subject matter of any one of Examples 26-27, further comprising means for selecting a reference current based at least in part on the charge state of the battery, wherein the means for determining the charge state of the battery comprises: means for comparing a voltage of the battery to a lower threshold value; and means for comparing the voltage of the battery to an upper threshold value, wherein the means for selecting the reference current comprises: means for selecting a battery precharge current as the reference current in response to the battery voltage is below the lower threshold value; means for selecting a battery upper charge current as the reference current in response to the battery voltage is not below the lower threshold value; and means for selecting an absorption current as the reference current in response to the battery voltage is not below the upper threshold value, wherein the means for switching the power stage control signal also switches the power stage control signal based at least in part on the reference current.

Example 29 may include the subject matter of Example 28, further comprising: means for generating a current level control signal based at least in part on the reference current and a current of the battery, wherein the means for switching the power stage control signal also switches the power stage control signal based at least in part on the current level control signal.

Example 30 may include the subject matter of any one of Examples 26-29, further comprising means for selecting a reference current based at least in part on the charge state of the battery, wherein the means for determining the charge state of the battery comprises: means for comparing a voltage of the battery to a lower threshold value; and means for comparing the voltage of the battery to an upper threshold value, wherein the means for selecting the reference current comprises: means for selecting a battery precharge current as the reference current in response to the battery voltage is below the lower threshold value; means for selecting a battery upper charge current as the reference current in response to the battery voltage is not below the lower threshold value; and means for selecting an absorption current as the reference current in response to the battery voltage is not below the upper threshold value, wherein the means for performing the power point check of the power source comprises: means for determining a power level change based at least in part on a first power level of the power source and a subsequent second power level of the power source; and means for determining a voltage level change based at least in part on a first voltage level of the power source and a subsequent second voltage level of the power source, wherein the means for switching the power stage control signal comprises means for indicating an off state in response to the power level change is negative and the voltage level change is negative and wherein the means for switching the power stage control signal also switches the power stage control signal based at least in part on the reference current.

Example 31 may include the subject matter of any one of Examples 26-30, wherein the means for delivering power to the battery comprises means for delivering power to the battery with a buck power stage based at least in part on the power stage control signal.

Example 32 may include the subject matter of Example 31, wherein the means for performing the power point check of the power source comprises: means for determining a power level change based at least in part on a first power level of a harvested power source and a subsequent second power level of the harvested power source; and means for determining a voltage level change based at least in part on a first voltage level of the harvested power source and a subsequent second voltage level of the harvested power source.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An electronic battery charge controller comprising:
   a reference current selector to receive a battery voltage sense input, wherein the reference current selector includes a lower threshold detector, an upper threshold detector, and a multiplexer coupled with the lower threshold detector and the upper threshold detector, the multiplexer to output a reference current level signal based at least in part on the battery voltage sense input, an output of the lower threshold detector, and an output of the upper threshold detector;
   a power point check detector to receive a power supply sense input, the power point check detector to output a power point check signal based at least in part on the power supply sense input; and
   a controller coupled to the reference current selector and the power point check detector, the controller to receive a battery current sense input and switch a control output based at least in part on a comparison of the reference current level signal to the battery current sense input, and on the power point check signal.

2. The electronic battery charge controller of claim 1, wherein the power point check detector is to receive a power supply sense input comprising:
   a power supply voltage sense input; and
   a power supply current sense input,
   and wherein the power point check detector comprises:
   a power change detector to receive the power supply voltage sense input and the power supply current sense input, the power change detector to output a power change signal based at least in part on the power supply voltage sense input and the power supply current sense input; and
   a voltage change detector to receive the power supply voltage sense input, the voltage change detector to output a voltage change signal based at least in part on the power supply voltage sense input,
   the power point check detector to output the power point check signal based at least in part on the power change signal and the voltage change signal.

3. The electronic battery charge controller of claim 1, wherein:
the lower threshold detector is to receive the battery voltage sense input, the lower threshold detector to output a lower threshold signal based at least in part on the battery voltage sense input and a predetermined lower threshold value;
the upper threshold detector is to receive the battery voltage sense input, the upper threshold detector to output an upper threshold signal based at least in part on the battery voltage sense input and a predetermined upper threshold value; and
the multiplexer is to output the reference current level signal based at least in part on the lower threshold signal and the upper threshold signal.

4. The electronic battery charge controller of claim 3, wherein the multiplexer is to output the reference current level signal based at least in part on:
a battery precharge current level in response to the lower threshold signal indicates the battery voltage sense input is below the predetermined lower threshold value;
a battery upper charge current level in response to the lower threshold signal indicates the battery voltage sense input is not below the predetermined lower threshold value and the upper threshold signal indicates the battery voltage sense input is below the predetermined upper threshold value; and
an absorption current level in response to the upper threshold signal indicates the battery voltage sense input is not below the predetermined upper threshold value.

5. The electronic battery charge controller of claim 4, wherein the reference current selector further comprises a compensation module coupled to the battery voltage sense input, the compensation module to output the absorption current level based at least in part on the battery voltage sense input, the upper threshold value, and the battery upper charge current level.

6. The electronic battery charge controller of claim 1, wherein the controller comprises:
a comparator to receive the battery current sense input and the reference current level signal, the comparator to output a current level control signal based at least in part on the reference current level signal and the battery current sense input; and
a latch to switch the control output based at least in part on the current level control signal and the power point check signal.

7. The electronic battery charge controller of claim 1, wherein the power point check detector is to receive a harvested power supply sense input.

8. The electronic battery charge controller of claim 7, wherein the reference current selector, the power point check detector, and the controller are all integrated into a system on a chip, SoC.

9. The electronic battery charge controller of claim 8, wherein the power point check detector is to receive a harvested power supply sense input comprising:
a harvested power supply voltage sense input; and
a harvested power supply current sense input,
wherein the power point check detector comprises:
a power change detector to receive the harvested power supply voltage sense input and the harvested power supply current sense input, the power change detector to output a power change signal based at least in part on the harvested power supply voltage sense input and the harvested power supply current sense input; and
a voltage change detector to receive the harvested power supply voltage sense input, the voltage change detector to output a voltage change signal based at least in part on the harvested power supply voltage sense input,
wherein the power point check detector is to output the power point check signal based at least in part on the power change signal and the voltage change signal,
wherein the reference current selector comprises:
a lower threshold detector to receive the battery voltage sense input, the lower threshold detector to output a lower threshold signal based at least in part on the battery voltage sense input and a predetermined lower threshold value;
an upper threshold detector to receive the battery voltage sense input, the upper threshold detector to output an upper threshold signal based at least in part on the battery voltage sense input and a predetermined upper threshold value;
a multiplexer coupled to the lower threshold detector and the upper threshold detector, the multiplexer to output the reference current level signal based at least in part on the lower threshold signal and the upper threshold signal; and
a compensator coupled to the battery voltage sense input, the compensator to output an absorption current level based at least in part on the battery voltage sense input, the upper threshold value, and a battery upper charge current level,
wherein the multiplexer is to output the reference current level signal based at least in part on:
a battery precharge current level in response to the lower threshold signal indicates the battery voltage sense input is below the predetermined lower threshold value;
the battery upper charge current level in response to the lower threshold signal indicates the battery voltage sense input is not below the predetermined lower threshold value and the upper threshold signal indicates the battery voltage sense input is below the predetermined upper threshold value; and
the absorption current level in response to the upper threshold signal indicates the battery voltage sense input is not below the predetermined upper threshold value,
wherein the controller comprises:
a comparator to receive the battery current sense input and the reference current level signal, the comparator to output a current level control signal based at least in part on the reference current level signal and the battery current sense input; and
a latch to switch the control output based at least in part on the current level control signal and the power point check signal.

10. A method of charging a battery coupled to a power source and a load, the method comprising:
performing, by an electronic battery charger, a power point check of the power source;
determining, by the electronic battery charger, a charge state of the battery, wherein determining the charge state of the battery includes comparing a voltage of the battery to a lower threshold value, and comparing the voltage of the battery to an upper threshold value;
selecting, by the electronic battery charger, a reference current based at least in part on comparing the voltage of the battery to the lower threshold value and comparing the voltage of the battery to the upper threshold value;

switching, by the electronic battery charger, a power stage control signal based at least in part on the power point check and on comparing the charge state to the reference current; and causing, by the electronic battery charger, delivery of power to the battery in a single power conversion stage based at least in part on the power stage control signal.

11. The method according to claim 10, wherein performing the power point check of the power source comprises:
 determining a power level change based at least in part on a first power level of the power source and a subsequent second power level of the power source; and
 determining a voltage level change based at least in part on a first voltage level of the power source and a subsequent second voltage level of the power source,
 wherein switching the power stage control signal comprises indicating an off state in response to the power level change is negative and the voltage level change is negative.

12. The method according to claim 10,
 wherein selecting the reference current comprises:
  selecting a battery precharge current as the reference current in response to the battery voltage is below the lower threshold value;
  selecting a battery upper charge current as the reference current in response to the battery voltage is not below the lower threshold value; and
  selecting an absorption current as the reference current in response to the battery voltage is not below the upper threshold value.

13. The method according to claim 12, further comprising:
 generating, by the electronic battery charger, a current level control signal based at least in part on the reference current and a current of the battery,
wherein switching the power stage control signal is also based at least in part on the current level control signal.

14. The method according to claim 10, wherein determining the charge state of the battery comprises:
 comparing a voltage of the battery to a lower threshold value; and
 comparing the voltage of the battery to an upper threshold value,
wherein selecting the reference current comprises:
 selecting a battery precharge current as the reference current in response to the battery voltage is below the lower threshold value;
 selecting a battery upper charge current as the reference current in response to the battery voltage is not below the lower threshold value; and
 selecting an absorption current as the reference current in response to the battery voltage is not below the upper threshold value,
wherein performing the power point check of the power source comprises:
determining a power level change based at least in part on a first power level of the power source and a subsequent second power level of the power source; and
determining a voltage level change based at least in part on a first voltage level of the power source and a subsequent second voltage level of the power source,
wherein switching the power stage control signal comprises indicating an off state in response to the power level change is negative and the voltage level change is negative.

15. The method according to claim 14, wherein delivering power to the battery comprises delivering power to the battery with a buck power stage based at least in part on the power stage control signal.

16. The method according to claim 15, wherein performing the power point check of the power source comprises:
 determining a power level change based at least in part on a first power level of a harvested power source and a subsequent second power level of the harvested power source; and
 determining a voltage level change based at least in part on a first voltage level of the harvested power source and a subsequent second voltage level of the harvested power source.

17. A system comprising:
 a load including one or more of a processor, a memory device, or a display;
 a battery terminal coupled to the load;
 a power stage coupled to the battery terminal; and
 an electronic battery charger coupled to the power stage, the electronic battery charger comprising:
  a power point check detector to receive a power supply sense input, the power point check detector to output a power point check signal based at least in part on the power supply sense input;
  a reference current selector coupled to the battery terminal to receive a battery voltage sense input, wherein the reference current selector includes a lower threshold detector, an upper threshold detector, and a multiplexer coupled with the lower threshold detector and the upper threshold detector, the multiplexer to output a reference current level signal based at least in part on the battery voltage sense input, an output of the lower threshold detector, and an output of the upper threshold detector; and
  a controller coupled to the power point check detector, the reference current selector, and the power stage, the controller to receive a battery current sense input and switch a control output coupled to the power stage based at least in part on a comparison of the reference current level signal to the battery current sense input, and on the power point check signal.

18. The system of claim 17, wherein the power point check detector is to receive a power supply sense input comprising:
 a power supply voltage sense input; and
 a power supply current sense input,
and wherein the power point check detector comprises:
 a power change detector to receive the power supply voltage sense input and the power supply current sense input, the power change detector to output a power change signal based at least in part on the power supply voltage sense input and the power supply current sense input; and
 a voltage change detector to receive the power supply voltage sense input, the voltage change detector to output a voltage change signal based at least in part on the power supply voltage sense input,
the power point check detector to output the power point check signal based at least in part on the power change signal and the voltage change signal.

19. The system of claim 17, wherein:
 the lower threshold detector is to receive the battery voltage sense input, the lower threshold detector to output a lower threshold signal based at least in part on the battery voltage sense input and a predetermined lower threshold value;

the upper threshold detector is to receive the battery voltage sense input, the upper threshold detector to output an upper threshold signal based at least in part on the battery voltage sense input and a predetermined upper threshold value; and the multiplexer is to output the reference current level signal based at least in part on the lower threshold signal and the upper threshold signal.

20. The system of claim 19, wherein the multiplexer is to output the reference current level signal based at least in part on:

a battery precharge current level in response to the lower threshold signal indicates the battery voltage sense input is below the predetermined lower threshold value;

a battery charge current level in response to the lower threshold signal indicates the battery voltage sense input is not below the predetermined lower threshold value and the upper threshold signal indicates the battery voltage sense input is below the predetermined upper threshold value; and an absorption current level in response to the upper threshold signal indicates the battery voltage sense input is not below the predetermined upper threshold value.

21. The system of claim 20, wherein the reference current selector further comprises a compensator coupled to the battery voltage sense input, the compensator to output the absorption current level based at least in part on the battery voltage sense input, the upper threshold value, and the battery charge current level.

22. The system of claim 17, wherein the controller comprises:

a battery current comparator to receive the battery current sense input and the reference current level signal, the battery current comparator to output a current level control signal based at least in part on the reference current level signal and the battery current sense input; and a latch to switch the control output based at least in part on the current level control signal and the power point check signal.

23. The system of claim 17, wherein the power point check detector is to receive a harvested power supply sense input.

24. The system of claim 23, wherein the reference current selector, the power point check detector, and the controller are all integrated into a system on a chip, SoC.

25. The system of claim 24, wherein the power point check detector is to receive a harvested power supply sense input comprising:

a harvested power supply voltage sense input; and
a harvested power supply current sense input, wherein the power point check detector comprises:

a power change detector to receive the harvested power supply voltage sense input and the harvested power supply current sense input, the power change detector to output a power change signal based at least in part on the harvested power supply voltage sense input and the harvested power supply current sense input; and a voltage change detector to receive the harvested power supply voltage sense input, the voltage change detector to output a voltage change signal based at least in part on the harvested power supply voltage sense input, wherein the power point check detector is to output the power point check signal based at least in part on the power change signal and the voltage change signal, wherein the reference current selector comprises:

a lower threshold detector to receive the battery voltage sense input, the lower threshold detector to output a lower threshold signal based at least in part on the battery voltage sense input and a predetermined lower threshold value;

an upper threshold detector to receive the battery voltage sense input, the upper threshold detector to output an upper threshold signal based at least in part on the battery voltage sense input and a predetermined upper threshold value;

a multiplexer coupled to the lower threshold detector and the upper threshold detector, the multiplexer to output the reference current level signal based at least in part on the lower threshold signal and the upper threshold signal; and a compensator coupled to the battery voltage sense input, the compensator to output an absorption current level based at least in part on the battery voltage sense input, the upper threshold value, and a battery charge current level, wherein the multiplexer is to output the reference current level signal based at least in part on:

a battery precharge current level in response to the lower threshold signal indicates the battery voltage sense input is below the predetermined lower threshold value;

the battery charge current level in response to the lower threshold signal indicates the battery voltage sense input is not below the predetermined lower threshold value and the upper threshold signal indicates the battery voltage sense input is below the predetermined upper threshold value; and the absorption current level in response to the upper threshold signal indicates the battery voltage sense input is not below the predetermined upper threshold value, wherein the controller comprises:

a comparator to receive the battery current sense input and the reference current level signal, the comparator to output a current level control signal based at least in part on the reference current level signal and the battery current sense input; and a latch to switch the control output based at least in part on the current level control signal and the power point check signal.

* * * * *